United States Patent

[11] 3,632,217

[72] Inventor C. James Bartleson
Poughkeepsie, N.Y.
[21] Appl. No. 27,808
[22] Filed Apr. 13, 1970
[45] Patented Jan. 4, 1972
[73] Assignee Kollmorgen Corporation
Holyoke, Mass.

[54] TESTING DEVICE FOR DETERMINING THE CHROMATICITY SETTING OF TELEVISION MONITORS
1 Claim, 5 Drawing Figs.

[52] U.S. Cl. .................................................. 356/176,
356/178, 356/189, 356/191, 356/195, 356/213,
356/230, 250/226
[51] Int. Cl. ........................................................ G01j 3/46
[50] Field of Search ........................................ 356/173,
195, 229–234, 213; 250/226

[56] References Cited
UNITED STATES PATENTS
1,315,972  9/1919  Lacroix et al. ................. 356/230
3,492,070  1/1970  Zahn ................................ 355/37

FOREIGN PATENTS
81,470  11/1919  Switzerland .................. 356/230

OTHER REFERENCES
Martin et al., " Contrast Measurement in TV Images," Radio– Electronic Engineering, June 1951, pp. 3– 5, 27.
Miller et al., " Portable Telescopic Visual Colorimeter," J. Opt. Soc. America, 48, (7), July 1958, pp. 474– 479.
Walsh, J. W. T., Colorimetry Section of " Photometry," pub. by Constable & Co. (London), 1958, pp. 321, 332– 339.

Primary Examiner—William L. Sikes
Assistant Examiner—R. J. Webster
Attorney—Frederick E. Bartholy ABSTRACT: A testing device for determining the chromaticity setting of television monitors is described. It consists of a housing adapted to be placed against the surface of a cathode-ray tube and includes a reference white light. Optical means are provided for presenting an image of the reference light and that of the cathode-ray tube over distinct areas of a diffusing medium, together with ocular means for simultaneous viewing of these areas for comparison.

INVENTOR
C. JAMES BARTLESON

BY Frederick E Dunthie

ATTORNEY

PATENTED JAN 4 1972
3,632,217
SHEET 2 OF 2
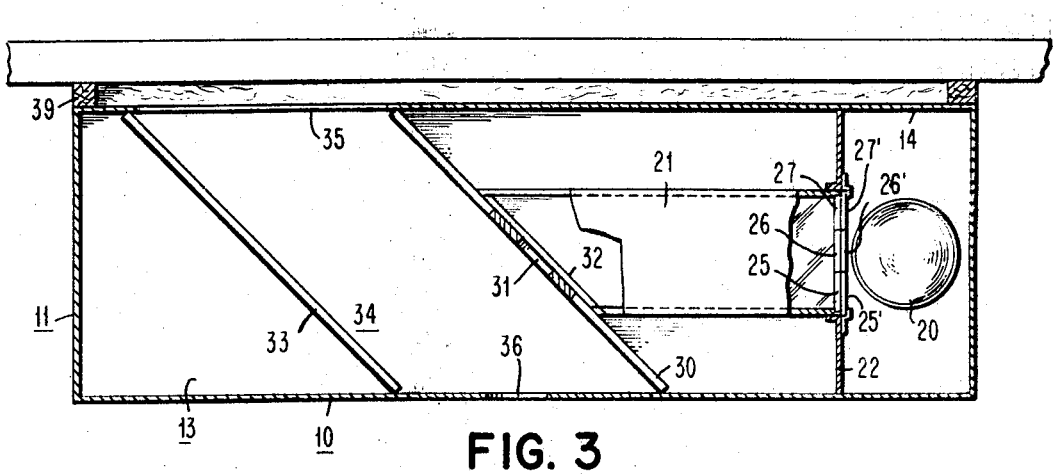
FIG. 3
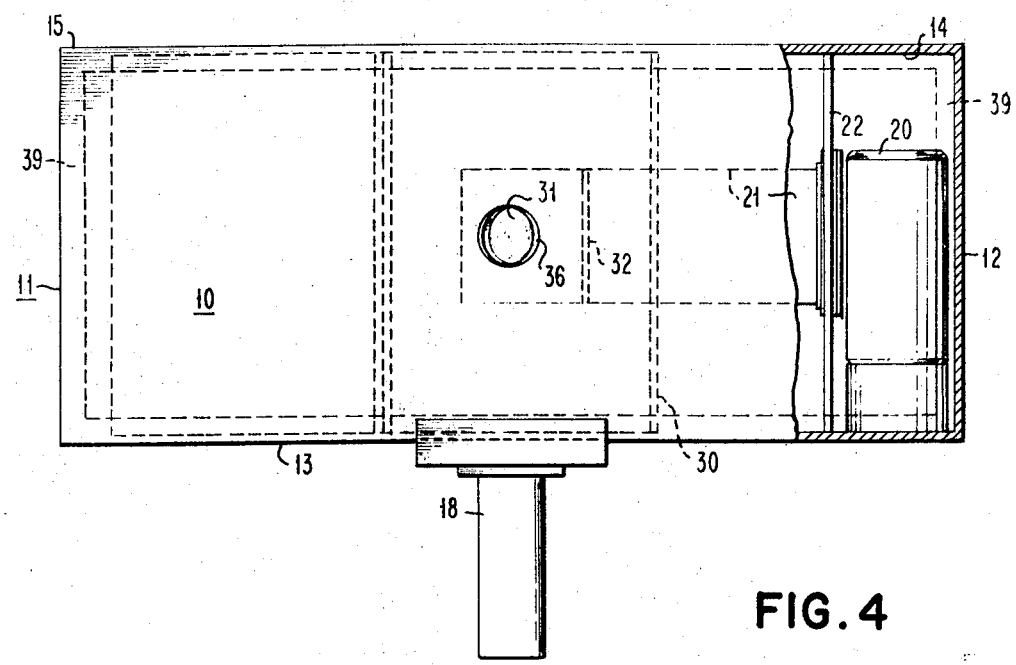
FIG. 4
FIG. 5
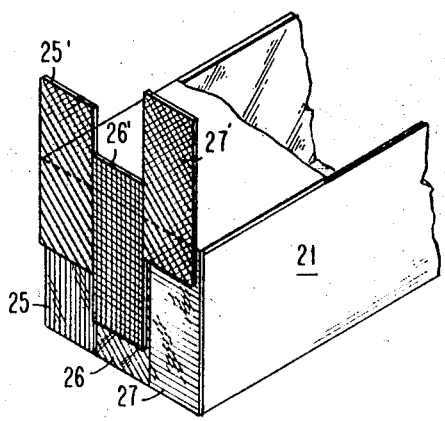
INVENTOR
C. JAMES BARTLESON
BY *Frederick E Bartho*
ATTORNEY

TESTING DEVICE FOR DETERMINING THE CHROMATICITY SETTING OF TELEVISION MONITORS

BACKGROUND OF THE INVENTION

This invention relates to color television broadcasting and, more particularly, to a simple device for determining the proper adjustment of monitors in a color television transmitting station. During a telecast, various monitors are used, connected in closed circuit with the transmitting equipment. These monitors serve the purpose of showing the transmission to the technicians and supervisors of the broadcasting station.

It is important that each of these monitors have like chromaticity, i.e., each should present the same color rendition of the transmitted program so that the color quality may be judged by the various observers. In order that this condition should prevail, each monitor must be adjusted to a white reference standard.

An international standard of color specification has been adopted by the International Commission on Illumination. The color specification is a complex system for accurate color evaluation. Mathematical equations based on tristimulus color mixture curves have been set up. In order to determine the color resulting from any mixture of the primaries, use is made of a color analyzer which is an instrument of considerable complexity, requiring expert handling, and the final evaluation must necessarily be time consuming. It would be impractical to use such intricate instruments in television studios for adjustment of the various monitors, particularly since experience has shown that extreme accuracy is not needed.

In television, the primary colors under consideration must necessarily be limited by the color phosphors that are available for the picture tube. After considerable study it was found that the available phosphors gave a red primary having a dominant wavelength of 610 millimicrons; the green, approximately 540 millimicrons; and the blue, approximately 470 millimicrons.

The problem with which the invention is concerned is to find practical means for synchronizing the color reproduction of television monitors so that each would present identical color rendition of the transmitted program. In order to do this, a reference white light resulting from a predetermined mixture of such primary colors must be selected, which corresponds to those available from the above-described phosphors.

A simpler method of specifying colors in the white region uses degrees of Kelvin to designate a particular color. This system is based on the color of metal when heated to various degrees of temperature. It will change from red at a lower temperature to white at a high temperature and to a bluish cast as the temperature is further increased. A standard selected by the National Television System Committee as to white reference for color television work is known as CIE Illuminant D6500. This represents a phase of natural daylight having a color temperature of 6,500° Kelvin. It is this white light standard to which television transmitters must correspond and to which, of course, the monitors should be adjusted.

As mentioned before, at the present time it would be impractical to make use of industrial colorimetry every time television monitors are to be synchronized. As a matter of fact, it was found that, for all practical purposes, it is not of great importance to have television monitors of various stations exactly in color harmony. It is sufficient that the monitors of one television station be set to a uniform reference approximating that of the chosen 6,5000 °Kelvin source.

Accordingly, it is a primary object of this invention to provide a simple testing device for determining the setting of chromaticity of television monitors which may easily be adjusted to provide a standard white reference and when placed against the picture tube of the television monitor, enables the user to observe distinct areas adjacent to each other, one of these areas representing the reference light and the other that of the cathode-ray tube.

It is a particular feature of the invention that the device is extremely simple in construction and easily adjustable to a standard illuminant for obtaining a white reference source of reliable accuracy for the purpose intended.

It is a particular advantage of the invention that use can be made of the device by anyone skilled in technical phases of television broadcasting for rapid evaluation of the chromaticity setting of all monitors at a television station.

Other objects, features and advantages will be apparent from the following description of the invention, pointed out in particularity in the appended claims, and taken in connection with the accompanying drawings, in which:

FIG. 3 is a sectional view taken along lines 3—3 of FIG. 1.

FIG. 4 is a front elevational view illustrating the ocular portion.

FIG. 5 is a partial perspective view of the integrating light tunnel and the arrangement of filters and obturating slides thereof.

DETAILED DESCRIPTION

Figure 1:
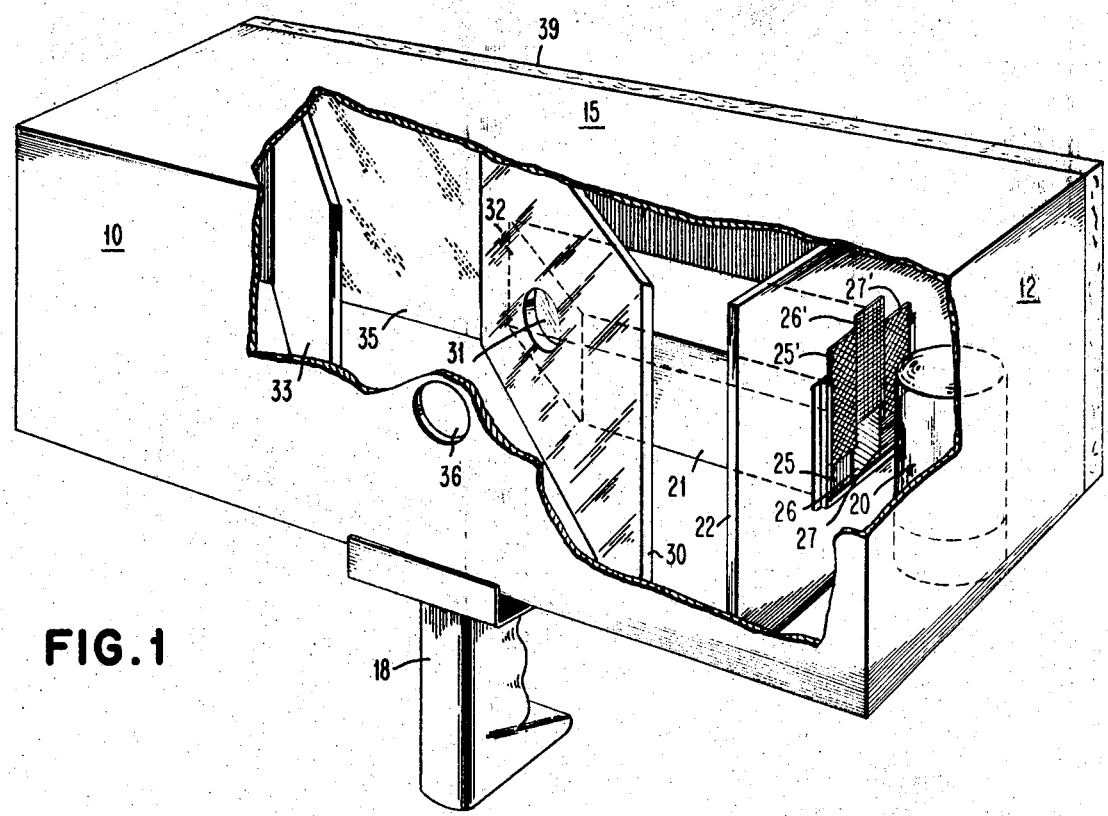
FIG. 1 is a perspective view of the testing device, the housing of which is partially cut away to illustrate the internal construction thereof.

Referring to the drawings, it is seen that the testing device is of generally oblong configuration, having a front wall 10, sidewalls 11 and 12, bottom wall 13, backwall 14, and top wall 15 which form a lighttight housing. A hand grip 18 is arranged to be affixed to the bottom 13 of the device in any suitable manner so that an operator may use it with ease for the purpose intended.

Within the housing, near the wall 12, is located a light source 20, preferably of the incandescent type, having a filament capable of emitting light energy incorporating the wavelengths necessary for filtering into primary colors. Facing the light source 20, is a mirror tunnel 21 supported at one end in a dividing wall 22. The mirror tunnel 21 shown here is an oblong structure, the inner walls of which have reflecting mirror surfaces for the purpose of integrating the light emitted from the source 20. A tubular structure would serve the purpose equally as well.

The entrance of the tunnel is covered by a low-saturation, tricolor mosaic comprising a red filter 25, a green filter 26, and a blue filter 27. This is seen in greater detail in the partial illustration in FIG. 5. Each filter is provided with an obturating slide 25', 26', and 27', respectively. By proper positioning of the slides, desired portions of each filter may be covered and thereby the luminance adjusted to the balance required for obtaining the white reference light of 6,500° Kelvin as mentioned before, i.e., Illuminant D6,500.

The opposite end of the tunnel 21 is supported by a slanted separating wall 30 and terminates in a narrow opening covered by a translucent disc 31 set into the end wall 32 of the tunnel 21. The inner surface facing the sidewall 11 of the wall 30 is a reflecting mirror. Facing the disc 31 is the wall 33 which is parallel to that of the wall 30 and is also covered by a mirrored surface. The walls 30 and 33 are spaced at a certain distance from each other, defining a channel 34. One end of this channel terminates at the rear wall 14 in a diffusing medium 35, such as ground glass or plastic. The front wall 10 is provided with an opening 36 facing the channel 34. The rear wall is provided with a resilient padding 39 running around the edge of the housing. This padding may be felt or similar material and has the purpose of protecting the face of the cathode-ray tube when the device is placed against it and also to exclude extraneous light which would interfere with the chromaticity evaluation.

Figure 2:
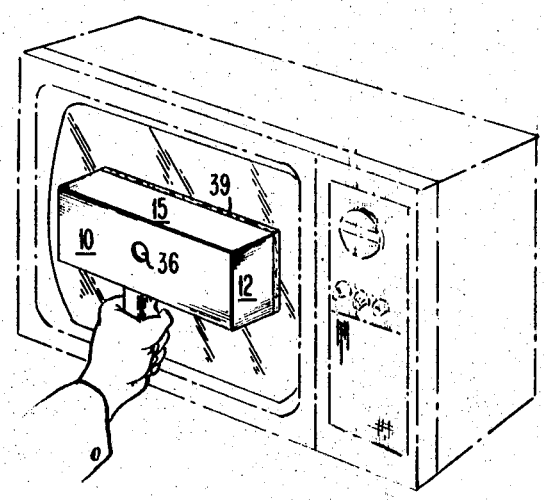
FIG. 2 is a perspective view illustrating the application of the testing device to a television receiver.

Referring to the operation of the testing device, the user places the housing against the cathode-ray tube surface of a television receiver by utilizing the hand grip 18. This is illustrated in FIG. 2. Looking into opening 36, one observes two images on the diffusing medium 35. A centrally located circular area indicates the white reference light obtained through the filters 25, 26, and 27 and integrated by the mirror tunnel 21. The area adjacent to the reference white light is the reflection —by means of the mirrors of the walls 30 and 33—of the light illuminating the ground glass directly from the cathode-ray tube. The difference between the illumination of the two areas represents the departure of the cathode-ray tube illumination from that of the reference light. By suitable controls provided in the television receiver, the chromaticity of the picture tube illumination may then be adjusted to match that of the reference white light. Upon proper adjustment, the two areas over the diffusing medium 35 will blend so that the observer will see no outline of the translucent disc 31. The monitor will have the proper luminance adjustment for each color gun of the picture tube.

From the above it is seen that the device enables quick checking of each monitor by simple visual observation and rapid alignment of various monitors to correspond to the prescribed standard.

The invention in its broader aspects is not limited to the specific embodiments herein shown and described but departure may be made therefrom within the scope of the accompanying claims without departure from the principles of the invention and without sacrificing its chief advantages.

What is claimed is:

1. A testing device for determining the chromaticity setting of television monitors comprising a housing having a wall for placement against the surface of the cathode-ray picture tube of said monitor, a white reference light source within said housing having a chromaticity of predetermined value, means for projecting said light over a distinct area of a ground glass diffuser in said wall, said diffuser being so located as to receive light from said tube over another distinct area adjacent to said first area, ocular means for permitting simultaneous observation of said areas for comparison of the chromaticity thereof, said housing being of oblong shape having front, back, side, top and bottom walls forming a lighttight enclosure, said backwall being for placement over the surface of said tube, an opening in said wall accommodating said ground glass diffuser, said front wall having a viewing aperture and reflecting mirrors in said housing positioned to present an image of said ground glass at said aperture.

* * * * *